United States Patent
Carter et al.

(10) Patent No.: US 7,057,733 B2
(45) Date of Patent: Jun. 6, 2006

(54) SCANNING IR MICROSCOPE

(75) Inventors: Ralph Lance Carter, Oxon (GB); Robert Alan Hoult, Bucks (GB)

(73) Assignee: Singapore Pte. Ltd., Singapore (SG)

( * ) Notice: Subject to any disclaimer, the term of this patent is extended or adjusted under 35 U.S.C. 154(b) by 0 days.

(21) Appl. No.: 10/779,959

(22) Filed: Feb. 17, 2004

(65) Prior Publication Data
US 2004/0222378 A1    Nov. 11, 2004

Related U.S. Application Data

(63) Continuation of application No. PCT/GB02/03811, filed on Aug. 19, 2002.

(30) Foreign Application Priority Data
Aug. 17, 2001    (GB)    ................... 0120170.6

(51) Int. Cl.
*G01B 9/02*    (2006.01)

(52) U.S. Cl. .................................... 356/452

(58) Field of Classification Search ................ 356/451, 356/452, 456; 250/339.08
See application file for complete search history.

(56) References Cited

U.S. PATENT DOCUMENTS 5,945,674 A * 8/1999 Dukor .................... 250/339.11
6,006,140 A * 12/1999 Carter ......................... 700/56

FOREIGN PATENT DOCUMENTS

EP    1 184 703 A1    3/2002

\* cited by examiner

*Primary Examiner*—Gregory J. Toatley, Jr.
*Assistant Examiner*—Michael A. Lyons
(74) *Attorney, Agent, or Firm*—St. Onge Steward Johnston & Reens LLC

(57) ABSTRACT

An FT-IR microscope is operated in association with a scanning spectrometer in such a way that incremental movement of the movable stage of the microscope is synchronized with the scans of the scanning spectrometer. This minimizes delays in processing time.

6 Claims, 1 Drawing Sheet

SCANNING IR MICROSCOPE

This application is a continuation of pending International Patent Application No. PCT/GB02/03811 filed Aug. 19, 2002, which designates the United States and claims priority of pending U.K. Patent Application No. 0120170.6 filed Aug. 17, 2001.

FIELD OF THE INVENTION

This invention relates to a microscope which can be used in a Fourier Transform Infrared (FT-IR) spectroscopy. FT-IR microscopes generally operate in conjunction with an FT-IR spectrometer. The IR beam used by the microscope is produced by the spectrometer which also controls the scanning.

BACKGROUND OF THE INVENTION

Currently available FT-IR microscopes capable of generating an infrared image fall broadly into two categories: focal plane array systems, where a relatively large array detector is used to generate an image of a portion of a stationary sample; and single detector systems, where an image of arbitrary size is built up from individual pixels by translating the sample in small steps on a motorized stage in some form of raster scan. The large array based systems are generally obliged, by the low frame rates available from typical detectors, to use a very slow spectrometer scan, often a stepped scan, where an interferometric image of the sample is acquired at each spectrometer scan position before moving on to the next scan position; meanwhile, the sample does not move. The single detectors in contrast have much higher bandwidth, permitting a much more rapid spectrometer scan, typically not stepped, with interferogram data collected continuously during the scan. The present invention is concerned with this latter type of system where the sample is moved stepwise in its own plane after each spectrum acquisition, and concerns the speed and efficiency of data collection. The detector does not have to be a single detector but could be a small array of the type described in EP-A-1 184703 the disclosure of which is incorporated by reference.

One known FT-IR microscope currently generates images (or maps), one pixel at a time by a step and repeat sequence of operations. The cyclic sequence consists of:
  step the motorized sample stage to the next sample location;
  start the spectrometer scan;
  wait for the spectrometer scan to complete and stop;
  transfer the data;
  step the stage to the next sample location . . . .

The sequential nature of the operations produces substantial delays as each operation waits for the previous to complete, with the result that it takes a very long time to collect a reasonably-sized image.

BRIEF SUMMARY OF THE INVENTION

The proposal of the present invention is to synchronize the stage movement with the scan, minimizing the lost time and preferably effecting the stage movement within dead time encountered in the natural course of repeated spectrometer scans. Coupled with an extension of the operating principle to the collection of several pixels in parallel by utilizing a small array in place of the single detector, the result is a dramatic reduction of process time so that image collection can occur in times comparable to those achieved with the much more expensive large array based systems.

Embodiments of the invention can be implemented as follows:
  The first step is to keep the spectrometer scanning continuously in order to avoid the delays inherent in starting the scan from a halted condition. Then it becomes possible to step the microscope stage at any desired moment and simply wait for data to be collected from the next complete scan. This requires abandoning any scan actually in progress during the stage movement, which spoils the data being collected during that scan.

The next step is to synchronize the stage movement with the scan so that the loss of a scan is predictable rather than random. For example, suppose the stage movement, including settling time, took a substantial fraction of an individual scan time. Then depending upon exactly where the stage movement occurred, either one or two scans might be lost. Synchronizing the stage movement to the end of the scan would ensure that only one scan was lost. This degree of synchronism can be achieved simply by waiting for data transfer to complete but since stage movement can begin as soon as the previous scan has finished, without waiting for data transfer, it is preferable to arrange for a stage movement trigger signal to be passed just as soon as the previous scan has completed. Such a trigger signal might be propagated through the system using existing software channels.

The loss of one scan still has a substantial effect on the overall mapping rate. For example if we collect only one scan per pixel, the rate will be halved by the loss of every alternate scan. Obviously it would be preferable to lose no scans at all and this can be achieved by having a stage stepping time, including settling, that is shorter than the natural dead time between scans that occurs during the reversal of the mechanical scan direction. Even if the stage stepping time is a little longer than the scan dead time, it may be advantageous to artificially increase the scan dead time rather than to revert to losing a whole scan. Such tight synchronism requires rather rapid communication of a trigger signal from the scan controller to the stage controller just as soon as the previous scan has completed and this may be better achieved in direct hardware communication rather than through software with the delays typically encountered in non-real-time operating systems.

The final possibility is to move the stage continuously and at the same time, to scan continuously. This presents difficulties. Firstly, the sample spectrum is potentially changing while the scan is in progress and careful analysis is needed to determine what undesirable side-effects this may have. A second problem is to establish the correlation between scan and effective stage position. This requires a recording means to note the co-ordinates of the stage at, say, the start of each scan. Finally, there is the problem of error recovery. If either the stage or the scan does not operate at a constant rate, the data will appear at varying increments of stage movement. While small problems of this nature could be dealt with by interpolation, if either of the two mechanisms malfunctions even momentarily, recovery from the error will be fairly complex.

The preferred embodiment uses synchronous stepping of the stage in the dead time between scans as being the most appropriate solution. The scan controller notifies the stage controller that the previous scan has finished and that the stage may now be moved, by means of a dedicated hardware control line to obviate any unnecessary delays. The cyclic sequence of events then becomes:

wait for data collection from the scan currently in progress to complete;

send an immediate trigger signal to the stage controller . . . to step the motorized sample stage to the next sample location . . .

while at the same time transferring the data;

allow the scan to start its next data collection immediately after turnaround. . . .

It is believed to be a novel concept to provide a FT-IR microscope based on a rapid scan spectrometer in which the incremental sample stage movement is synchronized with the end of the spectrometer scan in such a way that effectively no lost data collection time is incurred. It is believed to be particularly advantageous to do this in a microscope which uses a small array detector in place of the single element detectors used previously. Such a microscope is described in EP-A-1-184703.

BRIEF DESCRIPTION OF THE DRAWING

The invention will be described now by way of example only with particular reference to the accompanying drawing, in which.

DESCRIPTION OF PREFERRED EMBODIMENT OF THE INVENTION

Figure 1:
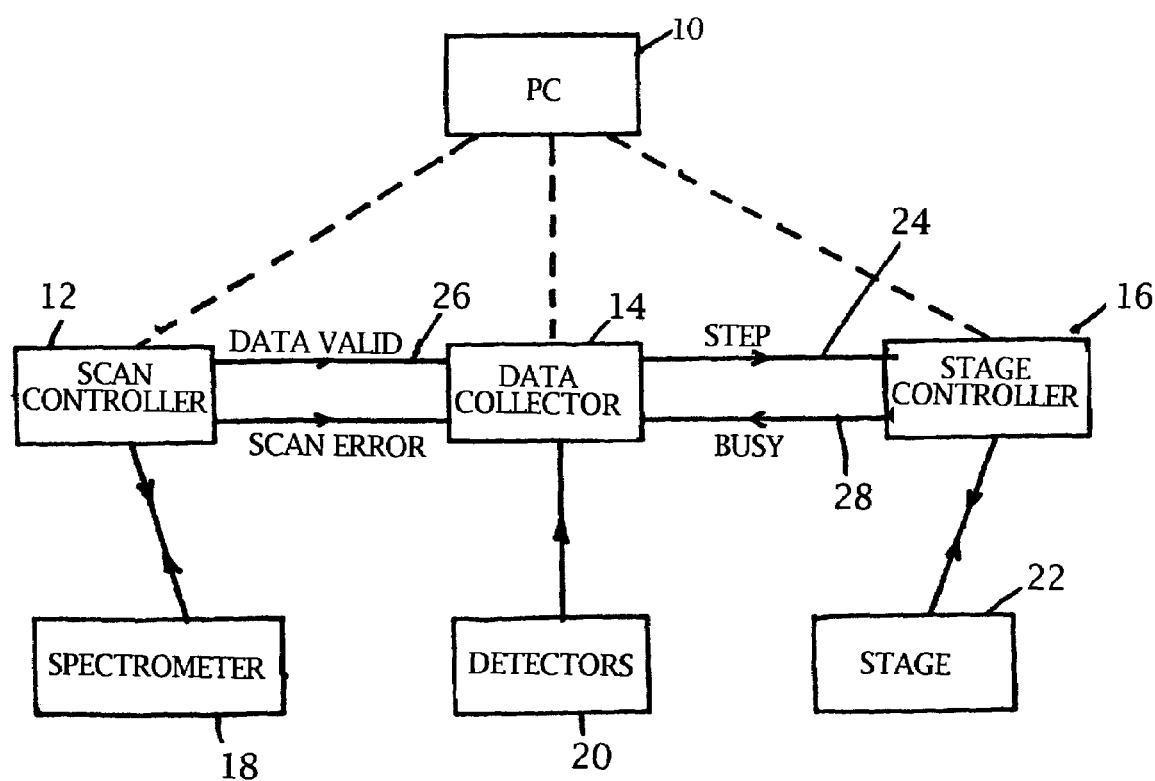
FIG. 1 is a block schematic diagrammatic view of an embodiment in accordance with the present invention.

The invention is applicable to a wide range of FT-IR microscopes which operate in conjunction with scanning spectrometers. The drawing shows a microscope imaging system which has four functional control blocks:— a personal computer PC (10), a scan controller (12) (part of the spectrometer), a microscope data collection (14) and a microscope stage controller (16). Real-time (guaranteed fast) links between the four blocks are shown as solid connecting lines and non-real-time links are shown as dashed.

The PC (10) acts as a master controller and has the overall task of coordinating the actions of the remaining three control blocks (12, 14, 16). As a result of the at-times-unpredictably slow response of its operating system, the PC is not relied upon to make real-time control decisions during the operating of the system but rather sets up the control functions in the other controllers ahead of time and then simply monitors the operation and processes incoming data when it can.

The scan controller (12) has the function of supervising the interferometer scan in the spectrometer (18). As will be known to the those skilled in the art it scans continually backward and forward, monitoring the position reached, by counting the periods of a sinusoidal signal generated as a function of distance travelled by means of laser metrology within the interferometer. Thus the controller (12) controls and monitors the length of active scan during which data should be collected and determines the characteristics and timing of the scan turnaround.

The microscope data collector (14) has the function of generating a stream of digitised data, converting the analog signals from the infrared detectors (20) of the microscope to numeric form at regular intervals determined by the same sinusoidal signal used by the scan controller (12). Digitised data is collected during the active scans and is ignored during the scan turnaround, i.e. the period between the end of one scan and the start of the next. The data collector receives a "scan active" signal issued by the scan controller (12) when a scan is currently active.

The microscope stage controller (16) has the function of controlling advances of the microscope stage (22) after data collection at a particular location has been completed and before data collection at the next location can begin. In a sweep across the sample, the step size is constant and scan be set up beforehand. As a result, it is only necessary for the stage controller (10) to be told when to step to the next location and this is communicated from the microscope data collector (14) by a single control line (24).

The system operates as follows: The PC (10) instructs the other control systems (12, 14, 16) in the basic parameters of the measurements: length of scan for the spectrometer and any details of scan turnaround; then number of data points per scan and number of scans to collect at each location for the microscope data collector; and finally, sample step size for the microscope stage controller. After allowing the systems to initialise themselves, the PC then issued a command to start the measurement.

The scan controller (12) issues the "data valid" signal on a line (26) to the microscope data collector as soon as the start of scan is reached and the data collector gathers digitised signals until the end of scan is signalled by the scan controller through the "data valid" signal. Data gathering recommences with the start of scan and the cycle continues until the requisite number of scans has been collected at the current sample. Note that if any errors are detected, the data collector can discard the current scan and simply wait for the next scan instead. Once the data collector has collected enough scans at the current sample location, it can signal the stage controller to advance the sample location by way of the line (24). This moment occurs at the end of the last scan, once the "data valid" has signalled the end of the scan and the data collector has verified that the scan is satisfactory. Provided any unnecessary delays are avoided, the signal to step the stage is sent by the data collector (14) to the stage controller immediately after the end of scan, just as the turnaround is starting. Typically, there will be sufficient time to advance the sample prior to the next scan, is which can data collection at the step sample location can resume with the following scan with consequently no loss of collection efficiency.

In some combination of circumstances, it may be that the sample step cannot be completed prior to the next scan. To guard against collecting data while the sample is still moving, the stage controller can flag to the data collector (14) via line (28) that it is currently moving the stage. If the data collector detects that the next scan has started before the move is completed, it can then discard the next scan and wait for the following one by which time the stage controller should certainly have finished the task of advancing the sample.

What is claimed is:

1. A method of operating an FT-IR (Fourier Transform Infrared) microscope in association with a scanning spectrometer which is operated in continuous scan mode, wherein incremental movement of the moveable stage of the microscope is synchronized with the scans of the scanning spectrometer, and movement of the microscope stage is initiated in response to a signal generated by the scanning spectrometer at the completion of a data collection step of a spectrometer scan.

2. A method of operating an FT-IR microscope according to claim 1 wherein the microscope is a single detector or small detector array type microscope.

3. A system for carrying out FT-IR spectroscopy using a scanning spectrometer operated in continuous-scan mode and an FT-IR microscope with a moveable stage wherein the system is so arranged that incremental movement of the moveable stage is synchronized with the scan of the scanning spectrometer, and movement of the microscope stage is initiated in response to a signal generated by the scanning spectrometer at the completion of a data collection step of a spectrometer scan.

4. A system according to claim 3 wherein the microscope is a single detector or a small detector array type microscope.

5. A system according to claim 3 including a scan controller for controlling the scanning of the spectrometer, a data collector for producing signals from the detector or detectors of the microscope, a stage controller for controlling movement of the microscope stage and a master controller for controlling the functions of the scan controller, data collector and stage controller.

6. A system according to claim 5, wherein the end of a scan is signaled to the stage controller by a signal generated by the scan controller and transmitted to the stage controller via the data collector.

* * * * *

UNITED STATES PATENT AND TRADEMARK OFFICE
CERTIFICATE OF CORRECTION

PATENT NO. : 7,057,733 B2
APPLICATION NO. : 10/779959
DATED : June 6, 2006
INVENTOR(S) : Ralph Lance Carter et al.

It is certified that error appears in the above-identified patent and that said Letters Patent is hereby corrected as shown below:

On Title page

Page 1
Item
(73) Assignee: should read --PerkinElmer International, C.V., Switzerland--

Signed and Sealed this

Fourteenth Day of August, 2007

JON W. DUDAS
*Director of the United States Patent and Trademark Office*